Patented July 31, 1951

2,562,577

UNITED STATES PATENT OFFICE 2,562,577

METHOD OF PURIFYING SODIUM STANNATE

Hartmut W. Richter, Rahway, N. J., assignor to Metal & Thermit Corporation, New York, N. Y., a corporation of New Jersey No Drawing. Application June 5, 1946, Serial No. 674,659

7 Claims. (Cl. 23—53)

This invention relates to a method of purifying sodium stannate and is characterized by its simplicity and effectiveness in transforming impure grades of sodium stannate into pure white crystals. The method, in brief, consists in heating the impure stannate at temperatures from about 800° C. to the point of incipient fusion thereof for a time sufficient to eliminate the impurities. In some cases it is desirable to perform the heating in the presence of an oxygen-containing gas to aid in removing oxidizable impurities.

Any commercial form of sodium stannate, whether anhydrous or not, may be improved as to color, purity and solubility by means of the invention, although the invention is particularly effective where the stannate is contaminated by organic impurities, which, under the treating conditions employed, become oxidized, forming carbon dioxide and other gases, which are driven off. By the expression "sodium stannate" it is intended to include both the commercial material and the anhydrous form of the commercial material, and also mixtures of these two materials. Mixtures of sodium stannate and various impurities, such as sodium carbonate, may be treated. A particular material with which good results have been obtained is sodium stannate obtained from alkaline detinning operations.

The temperature to which the stannate material is heated should be about 800° C. or above. At temperatures below this range it has been found that the stannate tends to undergo decomposition resulting in the formation of an insoluble powder. It has been discovered that at temperatures of about 800° C. and above, however, the tendency to form an insoluble product is reversed, and the product that is formed approaches 100% solubility as the temperature is raised above 800° C. The upper temperature limit is the point of incipient fusion of the stannate material that is being purified, and preferably the heating should be stopped just short of this point. For material comprising substantially pure stannate, the upper temperature limit is about 1200° C. The following example is illustrative:

Example 1

Six 100-gm. portions of technical straw-colored sodium stannate containing 98.5% $Na_2Sn(OH)_6$ and having complete water solubility were each heated at various temperatures by placing a shallow layer of the sample in a muffle furnace open to air. The presence of carbon dioxide in the heating zone is not objectionable. Thereafter the solubility of the samples was determined by sprinkling the finely ground calcined product into boiling water. The results are as follows:

| Sample No. | Temperature,° C. | Time, Hours | Solubility, Per Cent |
|---|---|---|---|
| 1 | 500 | 4 | 35.0 |
| 2 | 600 | 1 | 30.8 |
| 3 | 800 | 1 | 82.9 |
| 4 | 1,000 | 1 | 89.1 |
| 5 | 1,100 | 1 | 94.5 |
| 6 | [1]1,300 | 1 | ([2]) |

[1] Approximate.
[2] Incomplete due to fusion.

The solubility of sample No. 5 was found to be practically complete in a 1% NaOH solution. The high solubility of the material when heated at 800° C. or above is apparent, whereas at temperatures below 800° C. the solubility is low and is not favorably affected by extending the heating period, as shown by sample No. 1. It is also apparent that the solubility of the material treated above 800° C. is not substantially decreased by comparison with the original material, and that the solubility increases as the temperature is increased within the effective temperature range.

The heating operation may be performed in a furnace, as indicated above, or in a rotary kiln or other suitable apparatus. Heating may be continued until the product attains the desired solubility, as indicated by testing samples withdrawn from time to time. The sufficiency of heating of the material within the described temperature range may also be determined by a change of color of the material, there being a progressive change from brown to white during the heating. Heating time may vary with the temperature, shorter times being required at higher temperatures, and vice versa.

The invention is specially applicable in connection with detinning operations in which tin is recovered from scrap metal as an alkali metal stannate by the use of alkaline detinning solutions. Usually caustic detinning solutions are employed, tin being recovered in the form of sodium stannate. These solutions become easily discolored because of the presence of paint, oil and lacquer coatings on the scrap, which, when brought in contact with the hot detinning solutions, give rise to dark colored sodium soaps. Certain amounts of such soaps are invariably co-precipitated with the stannate and discolor the same, necessitating repeated, expensive and time-consuming recrystallizations to purify the stannate. Since the mother liquor and washings from the foregoing recovery steps are usually returned to the process without removal of the soaps, the latter tend to accumulate along with other organic material, and a further disadvantage is apparent. According to the invention the soaps that are co-precipitated with the stannate are eliminated, thus providing continuous removal of such impurities from the detinning process without the necessity of recrystallizing the stannate. If the hydrate is ultimately desired, a single recrystallization is all that is necessary. The following example illustrates the improved product recoverable from a typical crude stannate obtained by precipitation and evaporation of a detinning liquor:

Example 2

A strongly discolored crude sodium stannate having the following analysis:

|  | Per cent |
|---|---|
| $Na_2Sn(OH)_6$ | 37.2 |
| $Na_2CO_3 \cdot H_2O$ | 11.7 |
| Moisture and organic impurities | Balance | was calcined for two hours at 1000° C. in the presence of air. The product was a powder of pure white color analyzing as follows:

|  | Per cent |
|---|---|
| $Na_2SnO_3$ | 68.6 |
| $Na_2CO_3$ | 31.4 |

It was 98% soluble in boiling water and 99.5% soluble in boiling 0.75% NaOH solution. Of this product 270 gms. were dissolved in one liter of boiling 0.75% NaOH solution and the resulting colorless solution filtered, yielding a filtrate having the following analysis:

|  | gm./l. |
|---|---|
| Sn | 113 |
| Total NaOH | 143 |
| Free NaOH | 8 |

To 850 cc. of this filtrate were added 700 cc. of a solution containing 500 gm./l. NaOH, a precipitate of perfectly white crystals being formed which weighed 204 gms. and contained 88% sodium stannate ($Na_2Sn(OH)_6$), the balance being sodium carbonate, free alkali, and water.

In the light of the foregoing description, the following is claimed:

1. Method of purifying sodium stannate containing organic impurities which comprises heating it at about 800° C. to about 1200° C. under oxidizing conditions for a time sufficient to oxidize the impurities, thereby producing a purified sodium stannate product having a greater solubility in water than the product which would result if the heating were performed below about 800° C.

2. Method of purifying sodium stannate containing oxidizable impurities which comprises heating it at about 800° C. to about 1200° C. in the presence of a free oxygen-containing gas until said impurities have been eliminated, and recovering a sodium stannate product having a greater solubility in water than the product which would result if the heating were performed below about 800° C.

3. Method of purifying sodium stannate containing organic impurities which comprises heating said stannate at about 800° C. to the point of incipient fusion thereof in the presence of a free oxygen-containing gas until the impurities have been driven off, thereby producing a purified sodium stannate product having a greater solubility in water than the product which would result if the heating were performed below about 800° C.

4. Method of purifying sodium stannate containing as impurities in admixture therewith sodium carbonate, organic material and moisture which comprises heating the mixture at about 800° C. to the point of incipient fusion of said mixture under oxidizing conditions until at least a portion of said impurities have been removed.

5. Method of purifying sodium stannate containing impurities which comprises heating said stannate at a temperature in the range of about 800° C. to the point of incipient fusion under oxidizing conditions to enable the impurities to be eliminated without substantially decreasing the solubility in water of said stannate, said heating being continued until the impurities are removed.

6. Method of purifying impure sodium stannate which comprises heating said stannate to a temperature in the range of about 800° C. to the point of incipient fusion under oxidizing conditions, the water solubility of said stannate increasing as the temperature is increased within said range, said heating being continued until the impurities are removed.

7. Method of purifying impure sodium stannate which comprises heating the impure stannate at about 800° C. to the point of incipient fusion thereof in the presence of air and recovering a purified sodium stannate product having a greater solubility in water than the product which would result if the heating were performed below about 800° C.

HARTMUT W. RICHTER.

REFERENCES CITED

The following references are of record in the file of this patent:

UNITED STATES PATENTS

| Number | Name | Date |
|---|---|---|
| 1,041,895 | Spitz | Oct. 22, 1912 |
| 1,708,392 | McIlhenney | Apr. 9, 1929 |
| 1,984,342 | Hellmers | Dec. 11, 1934 |
| 2,055,732 | Schertel | Sept. 29, 1936 |
| 2,072,177 | Moore | Mar. 2, 1937 |
| 2,258,441 | Bozarth | Oct. 7, 1941 |
| 2,319,887 | Stack | May 25, 1943 |
| 2,413,762 | Gutzeit et al. | Jan. 7, 1947 |

OTHER REFERENCES

Mellor: "Comprehensive Treatise on Inorganic and Theoretical Chemistry," vol. 7, page 416 (1927), Longmans, Green & Co., N. Y. C.